Jan. 1, 1952

A. D. SIMPSON

2,581,210

POSITIVE PRESSURE MACHINE FOR FORMING
CONTINUOUS STRIPS OF ASBESTOS-CEMENT
COMPOSITIONS AND THE LIKE

Filed April 29, 1948

Patented Jan. 1, 1952

2,581,210

UNITED STATES PATENT OFFICE 2,581,210

POSITIVE PRESSURE MACHINE FOR FORMING CONTINUOUS STRIPS OF ASBESTOS-CEMENT COMPOSITIONS AND THE LIKE

Alvan D. Simpson, Plainfield, N. J., assignor to The Forming Machine Company of America, Inc., Bound Brook, N. J., a corporation of Delaware Application April 29, 1948, Serial No. 24,054

10 Claims. (Cl. 92—43)

This invention relates in general to the manufacture of continuous strips of compositions of matter including asbestos and cement or similar materials. More particularly, the invention contemplates the deposit of material from a wet mix onto a perforate screen or like support under gas pressure so as to force the liquid from the mix through the screen and cause deposit of the solid matter in the mix in a layer on the screen; and more especially the invention contemplates a machine of the type wherein a drum or hollow cylinder having a perforate peripheral wall is mounted on a horizontal axis so that upon rotation of the drum the periphery is caused to move through a wet mix cf the asbestos-cement composition or the like to cause a layer of said composition to be deposited on the outer surface of the drum, and the deposited layer is then moved out of the mix to permit draining of the liquid from the layer, whereafter the layer is removed from the drum.

A prime object of the present invention is to provide a machine of this general character which shall embody novel and improved features of construction, whereby the wet mix can be rapidly deposited on the periphery of the drum or cylinder or on a filtering membrane mounted on the periphery of the drum, and the liquid can be quickly drained from the deposited film or layer, so that the machine shall be capable of an exceptionally high rate of production of a continuous strip of asbestos-cement composition or similar material. Heretofore in the manufacture of films of asbestos-cement composition, the composition has been deposited by screen cylinders from vats as a thin film upon a travelling felt belt which after receiving such deposits passes under an accumulator cylinder which picks the filament from the belt and winds it in several layers or laminations on the cylinder, creating a so-called laminated finished product. When the desired thickness of laminated product has been accumulated on the cylinder, the material is slit lengthwise of the cylinder so that the material falls from the cylinder as a sheet. In contrast to this, my invention contemplates the manufacture of a continuous strip of the desired finished thickness in a continuous operation.

Another object is to provide such a machine which shall be constructed in a novel and improved manner whereby positive air or other gas pressure, above atmospheric pressure, may be applied to the surface of the mix, and to the deposited layer, to cause rapid flow of the liquid from the mix through the periphery of the drum to produce rapid deposit of the composition on the drum, and also to rapidly force the liquid from the deposited layer.

A further object is to provide a novel and improved construction and combination of the drum and a container for the wet mix, whereby the liquid forced or drained from the deposited material shall accumulate in the drum and be quickly withdrawn therefrom in such a way as to prevent clogging of the perforations or interstices in the periphery of the drum by the solid matter that may be suspended in said liquid.

Another object is to provide in such a machine, novel and improved means for cleaning the surface and perforations of the drum continuously after the deposited layer has been removed from the drum.

A still further object is to utilize a perforated belt or filtering membrane on the perforate periphery of the drum and to guide the membrane out of contact with the drum periphery to facilitate removal of the deposited film as well as to expedite cleaning of both the perforations in the drum and the interstices in the belt or filtering membrane.

Other objects are to provide a machine for the purpose described which shall comprise a casing to receive the wet mix, a drum rotatable about a horizontal axis within the casing with a portion of its periphery submerged in the mix, means for applying air pressure above atmospheric pressure to the surface of the mix and to the portion of the periphery of the drum above the level of the mix, the casing having an opening for the withdrawal of the deposited strip, and means for sealing the space between the drum and the casing at the edges of said opening to prevent escape of the mix and the gas pressure from the casing; to provide means for applying a veneer, mix, coating, granular deposits such as crushed rock, stone, granite and the like, to the deposited layer before it is removed from the drum; to provide a novel and improved method and apparatus for producing deposited films or strips of various cross-sectional shapes of either uniform or variable thickness, and to obtain other advantages and results that will be brought out by the following description in conjunction with the accompanying drawing, in which.

Specifically describing the embodiment of the invention illustrated in Figures 1-7, inclusive, the machine includes a tank or casing A that is preferably, although not necessarily, approximately circular in cross-section and has inlets 1 at its bottom for a wet mix 2 of a suitable composition of matter, for example, an asbestos and cement composition such as is commonly used in the manufacture of building shingles and sidings or the like. This mix may be of any suitable consistency, and generally comprises solid particles, such as asbestos and cement, suspended in water; and the mix may be supplied to the tank in any suitable manner.

Figures 1, 2:
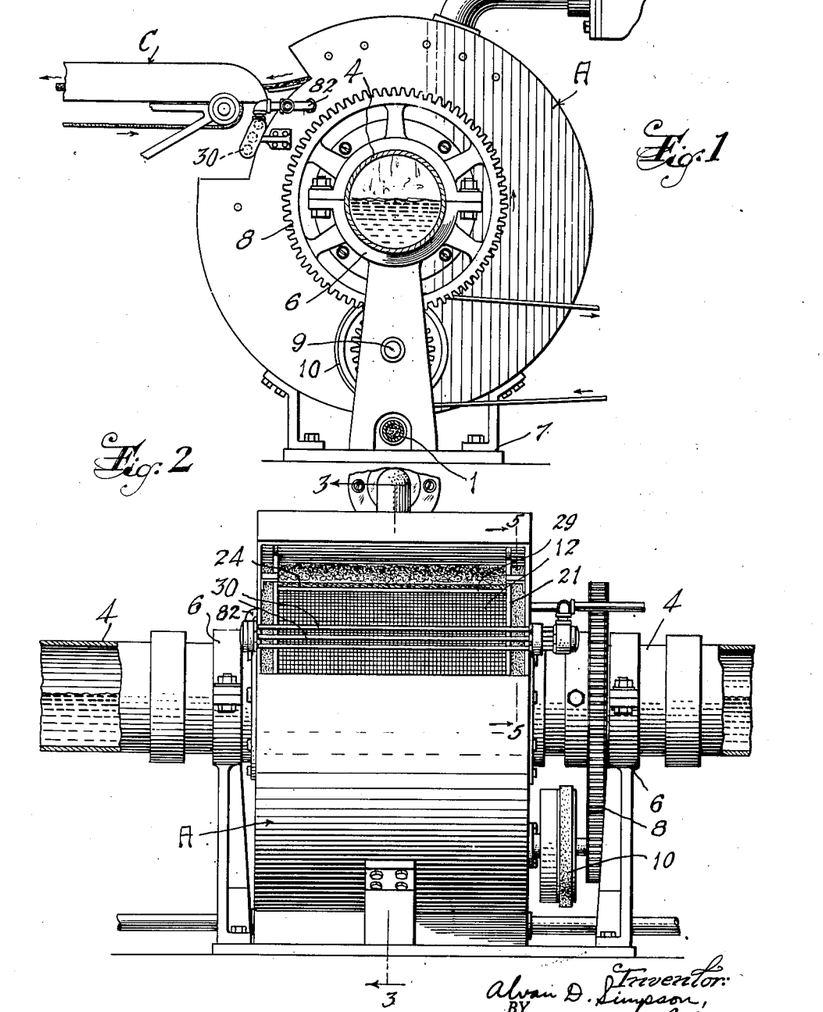
Figure 1 is an end elevational view of a machine embodying my invention.
Figure 2 is a front elevational view of the machine.
Figures 3, 4, 5, 6, 7:
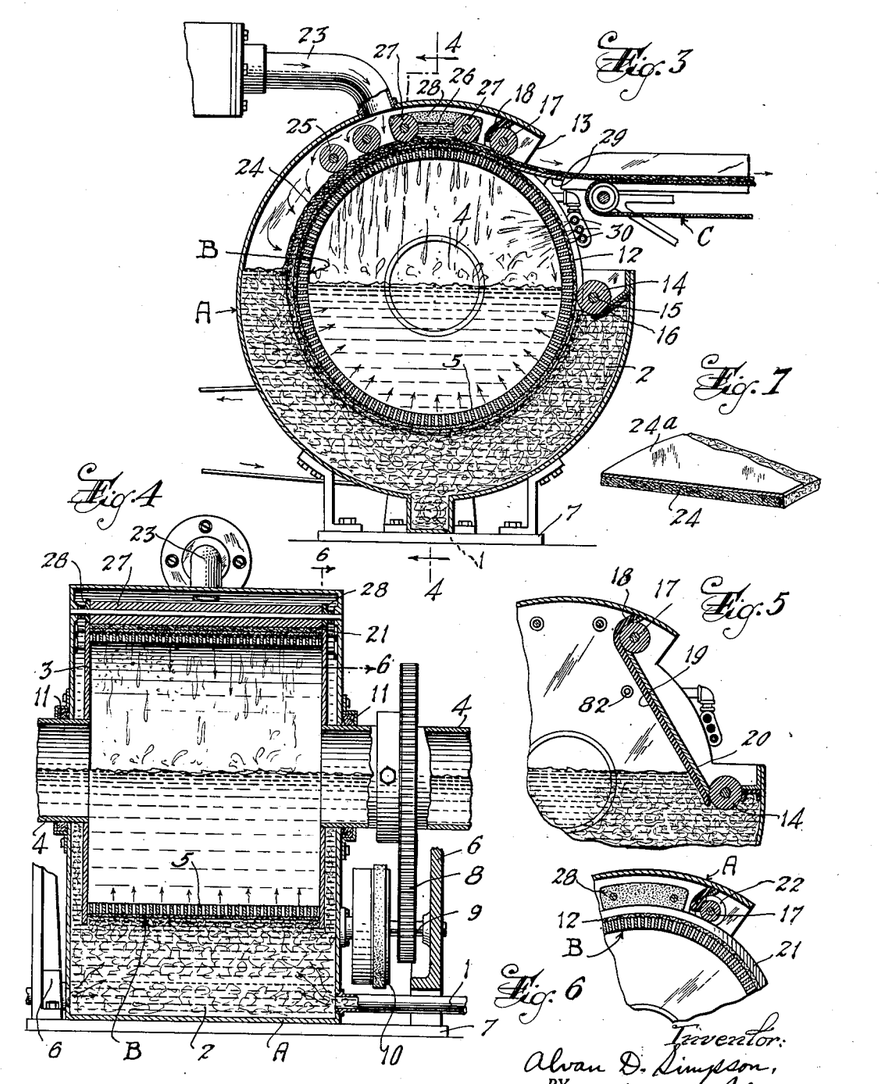
Figure 3 is a transverse vertical sectional view, approximately on the plane of the line 3—3 of Figure 2.
Figure 4 is a vertical longitudinal sectional view, approximately on the plane of the line 4—4 of Figure 3.
Figure 5 is a fragmentary transverse vertical sectional view, approximately on the plane of the line 5—5 of Figure 2.
Figure 6 is a similar view, approximately on the plane of the line 6—6 of Figure 4.
Figure 7 is a fragmentary sectional perspective view of a continuous strip produced by the machine.
Figures 8, 9, 10, 11, 12:
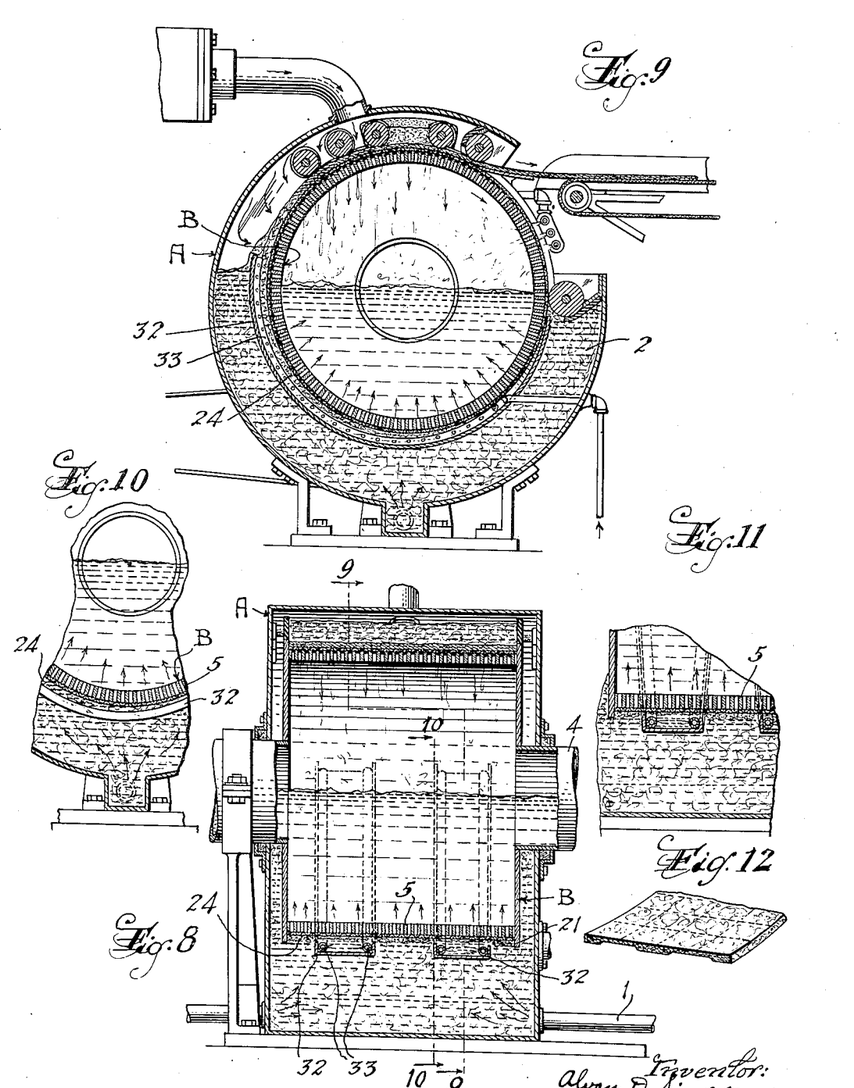
Figure 8 is a view similar to Figure 4, showing a modification of the invention.
Figure 9 is a transverse vertical sectional view, approximately on the plane of the line 9—9 of Figure 8.
Figure 10 is a fragmentary transverse sectional view, on the plane of the line 10—10 of Figure 8.
Figure 11 is a fragmentary view similar to Figure 8, showing a modification of the invention.
Figure 12 is a fragmentary sectional perspective view of the strip produced by the machine shown in Figures 8-10, inclusive.

Rotatably mounted about a horizontal axis in the tank is a hollow cylindrical rotor drum B having solid end walls 3 from which project coaxial tubular trunnions 4, and a perforate peripheral wall 5 connecting said end walls. The drum is located in the tank so that a lower portion thereof will be submerged in the mix 2 in the lower portion of the tank which forms a lower chamber, at opposite sides of a plane extending vertically and centrally or diametrally of the chamber, as best shown in Figure 3, and the drum may be rotatably mounted in any suitable manner as by journaling the trunnions 4 in bearings 6 that project upwardly from a base 7 on which the tank A is mounted, one of the trunnions being connected by a gear train 8 to a drive shaft 9 which may be connected to any suitable source of power, as by a belt and pulley 10. Suitable sealing means 11 are provided between the trunnions 4 and the walls of the casing to prevent the escape of the mix and the gas from the tank.

Upon the outer periphery of the drum is arranged a suitable filtering membrane such as a fine mesh, screen or gauze 12, whereby when the drum is rotated through the mix 2, the liquid from the mix will flow through the interstices in the screen 12 and the perforations in the drum so as to cause a deposit of some of the solid matter in the mix on the screen, and as the drum continues to rotate, this deposited solid matter is elevated out of the mix to the upper portion of the tank which provides an upper chamber where the liquid drains from the deposited layer downwardly into the drum from whence the liquid is drained off through the hollow trunnions 4, by gravity or by a pump.

For removing the deposited layer from the drum, an opening 13 is formed in the wall of the tank above the level of the mix, and the spaces between the drum and the walls of the tank at the edges of said opening are suitably sealed. As shown, a sealing roller 14 is journaled in the end walls of the casing on a shaft 15 with its periphery in tight contact with the screen 12 on the drum at or preferably below the level of the mix and also contacted by a rubber strip 16 to seal the space between the periphery of the roller and the circumferential wall of the casing. At the other side of the opening is a similar roller 17, the periphery of which contacts with the deposited layer on the drum and is also frictionally engaged by a rubber sealing strip 18 to seal the space between the roller and the circumferential wall of the tank. For sealing the spaces between said two rollers and between each end wall of the drum and the adjacent end wall of the tank, a rubber strip 19 is provided to contact both the rollers 14 and 17, said strip being reenforced against collapse from the pressure within the tank by a reenforcing wall 20. As shown, preferably the rotor drum B has circumferential end flanges 21 and the rollers 14 and 17 may be grooved, as indicated at 22 (see Figure 6), to provide clearance for said flange and permit the main portions of said rollers to engage respectively the filtering screen 12 and the deposited strip. It should be understood that the particular sealing means above described is merely illustrative, and that the necessary seals may be effected in any suitable manner.

In accordance with another feature of my invention, the gas under pressure in excess of atmospheric pressure is supplied to the tank A above the level of the mix, for example, from a suitable pump through a pipe 23; and this pressure will continuously exert pressure on the surface of the mix tending to accelerate the flow of liquid from the mix through the drum in the direction of the arrows shown in Figure 3, and at the same time force the liquid from the deposited layer 24 on the upper portion of the drum. Suitable finishing rollers 25 are journaled in the tank to contact with and press, smooth or shape the deposited layer 24. If desired, a surfacing substance such as a veneer, mix, coating, or granular deposits for example crushed stone, slate and the like, may be applied to the upper surface of said layer. Granular deposits may be applied according to known methods such as commonly used in the manufacture of asphalt shingles. A veneer may be applied in various ways; for example, as shown, a suitable wet veneer mixture 26 is supplied between two rolls 27, the spaces between the ends of which and the end walls of the tank are sealed by rubber blocks 28. As the deposited layer moves beneath the veneer mix, some of the latter is spread as a film on said layer. This veneer may be of any suitable type to effect the desired finish or color on the layer, and instead of being applied by the rolls 27, the veneer mix might be sprayed on the layer.

To facilitate removal of the deposited layer 24 from the drum, a stripper plate 29 may be utilized, and the layer or strip as it is loosened from the screen 12 may be conveyed to a suitable point by an endless belt conveyor mechanism C.

Figures 13, 14, 15:
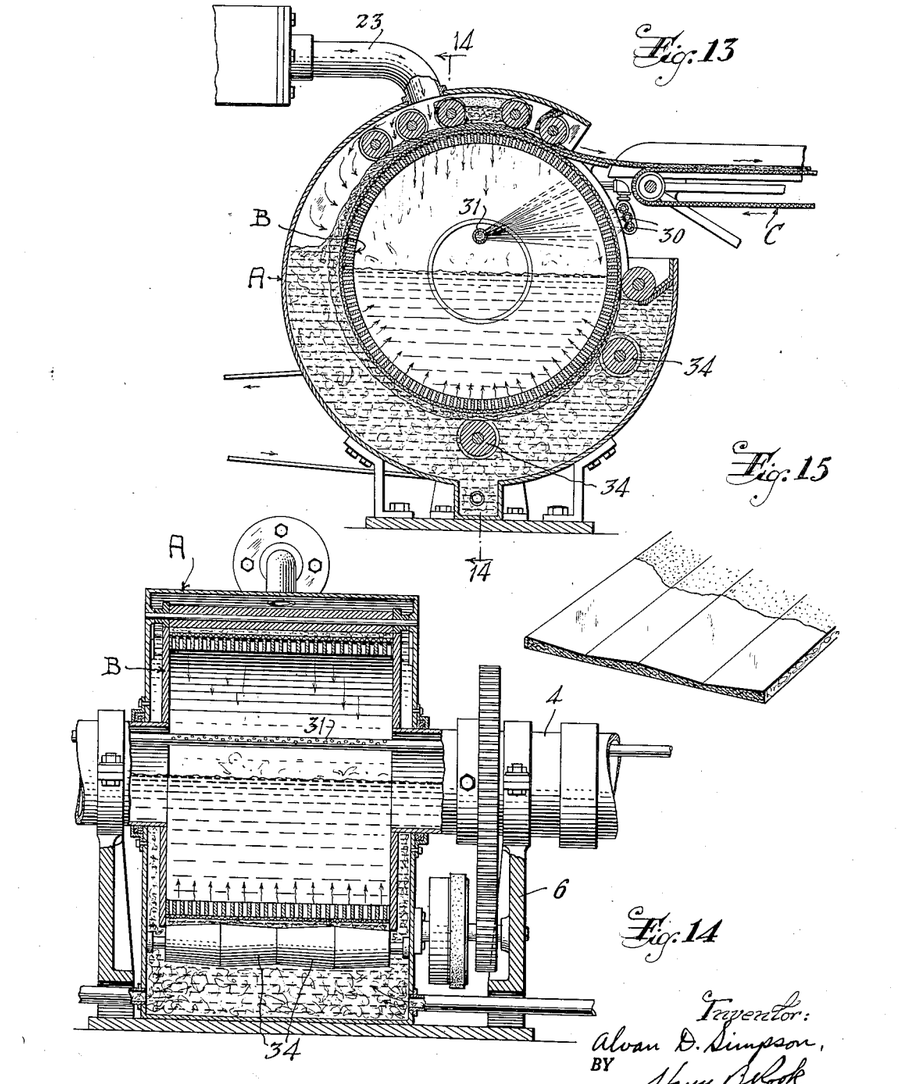
Figure 13 is a view similar to Figure 3, showing a modification of the invention.
Figure 14 is a view similar to Figure 4, illustrating the modification shown in Figure 13.
Figure 15 is a fragmentary sectional perspective view of a strip formed on the machine shown in Figures 13 and 14.
Figures 16, 18:
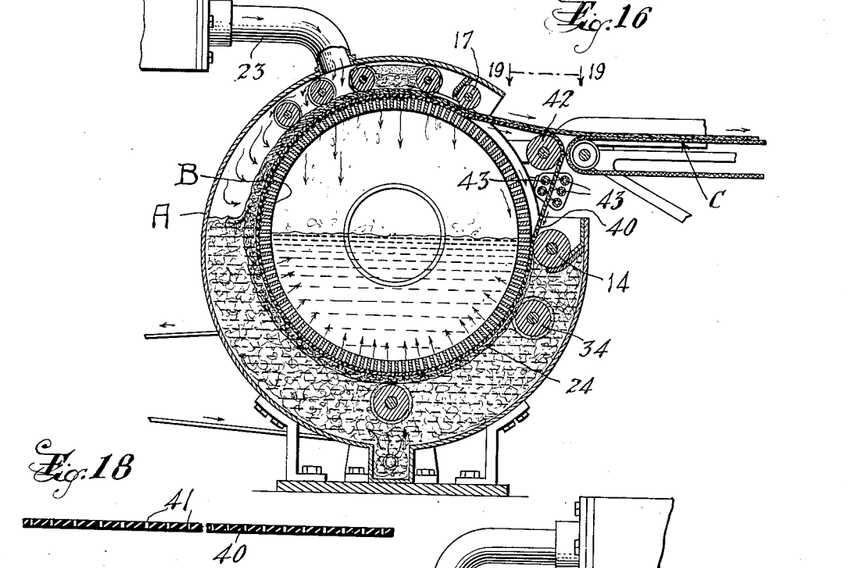
Figure 16 is a view similar to Figure 13, showing a further modification of the invention.
Figure 18 is an enlarged fragmentary transverse sectional view of the filtering belt or membrane shown in Figure 16.
Figures 17, 19:
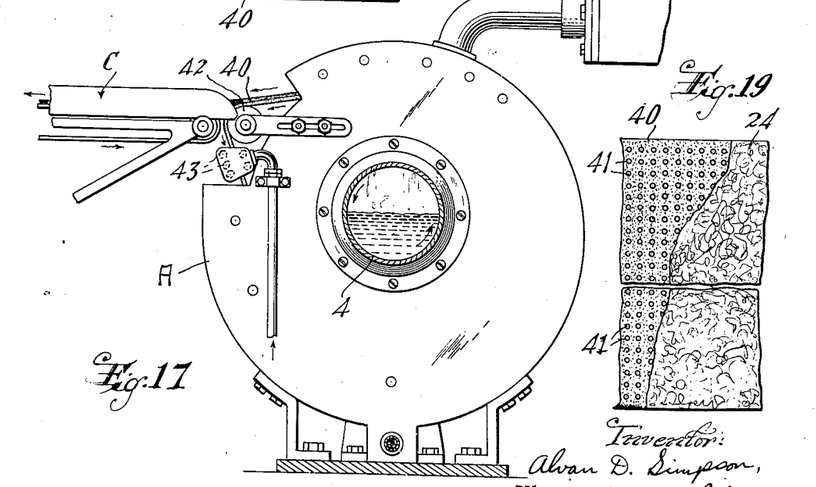
Figure 17 is an end elevational view, similar to Figure 1, of the machine shown in Figure 16.
Figure 19 is a fragmentary plan view of the filtering belt and a portion of the deposited strip, from approximately the plane of the line 19—19 of Figure 16.

After the layer has been removed from the screen, the screen is washed or flushed as by jets of water supplied from spray pipes 30 (see Figures 1, 2 and 3), and in addition, jets of gas or liquid may be projected through the perforations in the drum and the interstices in the screen 12 by a spray pipe 31 led into the drum through one of the hollow trunnions 4, as best shown in Figure 13.

More specifically describing the operation of the machine, the mix is fed into the tank A until the level rises above the roller 14 at the lower edge of the opening 13. The water showers or sprays 30 are then turned on and the rotor drum is started to revolve. This will cause a deposit of a very light or thin film on the screen of the solid matter in the mix, because of the small difference in level between the mix in the tank and the water within the rotor drum. When the drum is rotated sufficiently to bring this deposited film under the roller 17 at the upper edge of the opening 13, the compressed air is supplied through the pipe 23 into the space in the tank above the rotor drum. As the pressure builds up in this space, the air pressure causes the film to become thicker, due to the acceleration of the flow of liquid from the mix through the perforate drum, and as this film becomes thicker and better seals the screen 12 on the portion of the drum above the mix, it is possible to increase the air pressure above the drum. In this manner, the machine is brought to normal operation and the gas pressure, speed of the rotor drum and the mix concentration, are all adjusted so as to give the required thickness of the layer 24 at the desired production rate. The veneer, mix, coating or granular deposit may or may not be added to the layer, as desired.

It should be noted that the compressed air in the space above the drum slowly works its way through the deposited layer on the screen 12 and thus forces the excess water out of said layer; and due to the heavy pressure and the relatively small area, there is a marked drying effect. It will also be observed that simultaneously with this drying operation, the deposited layer is pressed by the finishing rollers 25, so that an excellent quality of deposit can be obtained without cracking of the layer.

Another important factor is that while the filtered liquid within the drum may contain some solid matter, particularly cement, the constant influx of the liquid from the mix into the drum and the removal of the filtered liquid through the ends of the drum, prevent the clogging of the perforations in the drum and screen. Also, the constant presence of the water on the inside of the rotor drum tends to dampen or counteract the violent action that would otherwise take place as the result of the heavy air pressure on the mix tending to force the mix through the perforate drum. If there were no liquid within the drum, such violent action would cause the minute asbestos fibers and other solid particles to become wedged tightly in the interstices of the screen 12, and thereby make it difficult to remove the deposited layer at the desired place of removal, in the particular instance, at the opening 13 in the tank. If particles were permitted to become wedged in the perforations or interstices of the screen or filtering membrane, it would be impossible to keep the screen or membrane clean with showers or fluid jets, as a consequence of which the perforations or interstices would become completely stopped up or clogged and no further deposit of the film would be possible.

Sometimes it is desired to form the deposited layer with a taper, offset or some uneven thickness, and this may be easily effected as shown, for example, in Figures 8–12, inclusive. As shown, one or more channels 32 may be disposed to partially overlie the film as it is deposited on the drum, and water may be injected into the channels through perforated pipes 33 so that the water from said pipes will reduce the amount of mix at the zones of the drum juxtaposed to the channels. The flanges of the channels 32 will be arranged to just clear the surface of the film deposited. With the arrangement shown in Figures 8–10, inclusive, a deposited layer of the cross-sectional form shown in Figure 12 may be produced. By changing the cross-sectional shape and dimensions of the channels (for example, see Figure 11), the shape or thickness of the deposited layer may be varied, the water within the channels in each case preventing the film from building up in the zones with which the water in the channels contacts.

Another manner of varying the cross-sectional shape or thickness of the deposited layer is shown in Figures 13 and 14, where rolls 34 of the desired shape may be caused to press against the layer while it is being deposited. When a roll is pressed against the layer while it is being formed, the roll will compress the layer and in so doing will partly close up the interstices or pores of the layer. This in turn will make the layer less filterable, which will affect the rate at which the layer will increase in thickness along the pressed zones. Consequently, if a tapered or unevenly shaped roll is pressed against the layer when the latter is partially built up, the final layer will have a similar thickness or shape, for example, as shown in Figure 15, which illustrates a layer that would be formed by the machine as shown in Figures 13 and 14. The extent of pressure exerted by the rolls may be varied as desired by using rolls of different diameters or by adjusting the rolls relative to the periphery of the filtering screen 12.

Figures 20, 21, 22, 23:
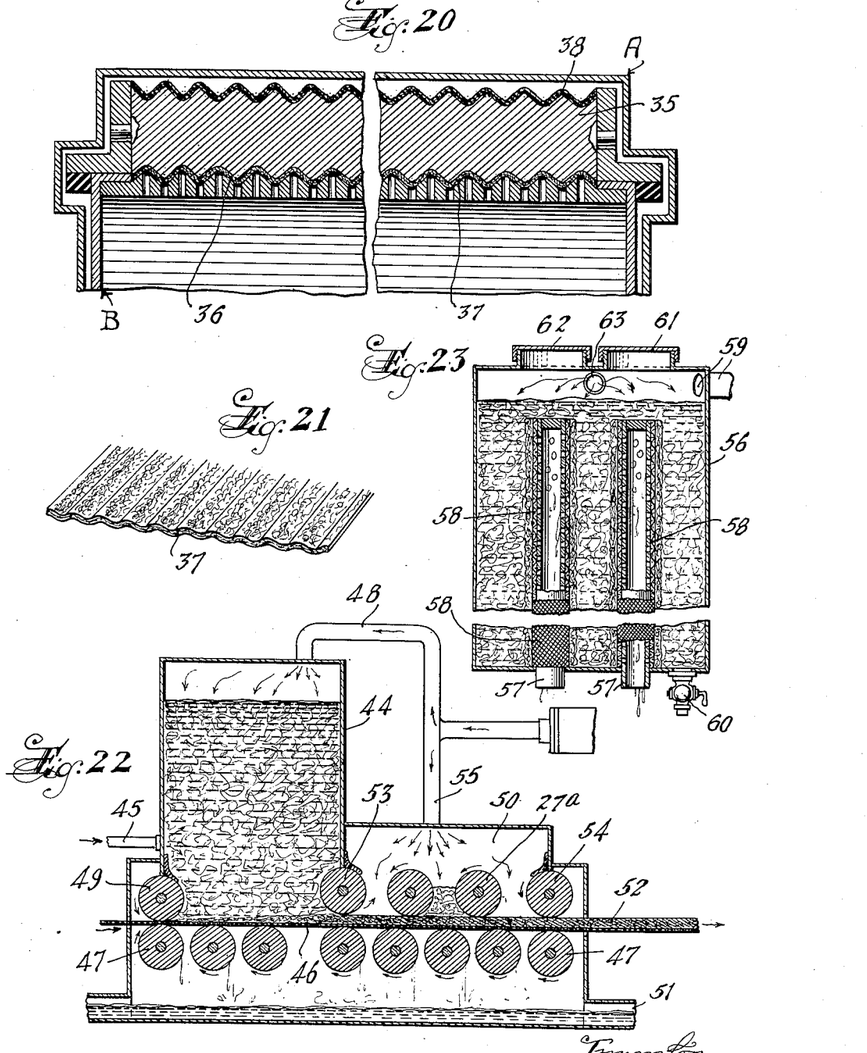
Figure 20 is an enlarged transverse vertical sectional view of a modified form of one of the finishing rollers.
Figure 21 is a fragmentary sectional perspective view of a deposited strip formed by a machine constructed according to Figure 20.
Figure 22 is a schematic longitudinal sectional view through a machine embodying a modification of the invention.
Figure 23 is a schematic sectional view of another modification of the invention especially designed for producing pipes.

Should it be desired to have the finished layer of a uniform thickness but other than flat in cross-section, the outer surface of the rotor drum and the rollers 25, 17, 27 and 14 may be shaped as desired to vary the cross-sectional shape of the layer and the thickness may also be varied by using rolls 34. For example, as shown in Figure 20, a roll 35 that corresponds to the roller 17 has a fluted or circumferentially ribbed periphery and the rotor drum has a similarly shaped outer surface, as indicated at 36, so as to press the deposited layer 37 between them to form a strip of the general shape that is illustrated in Figure 21. Where the roll is used to seal the opening 13 in the tank, the rubber sealing strip 38 will be shaped correspondingly to the periphery of the roller, as shown in Figure 20.

If desired, the filtering membrane may be in the form of a perforate belt which passes around the rotor drum B, as shown in Figures 16–19, inclusive. In this construction, the filtering membrane is shown in the form of a rubber belt 40 having a plurality of minute perforations or apertures 41 to register with the perforations in the rotor drum; and at the opening 13 the belt is directed away from the periphery of the drum around an idler roller 42. This facilitates the dislodgment of solids from the perforations, and preferably a plurality of spray pipes 43 are provided at one or both sides of the portion of the belt between the idler roller 42 and the periphery of the drum at approximately the point where the drum enters the mix. It may be desirable, also, to use a liquid or gas jet on the inside of the drum, like the jet pipe 31 of Figure 13, to clean the perforations in the drum along the portion thereof from which the belt has been displaced.

In Figure 22 is shown another form of a machine which comprises a tank 44 into which the mix is fed from a supply pipe 45, the lower end of the tank opening onto a filtering screen or belt 46 which is movable in the direction of the arrows over supporting rollers 47. Gas under pressure is forced into the tank 44 above the mix through a pipe 48 so as to force the liquid from the mix through the screen 46, and a suitable sealing roller 49 is provided between the wall of the tank and the screen and a sealing roll 53 between the wall of the tank and the deposited layer of material. Extending beyond the tank and above the screen is a gas pressure chamber 50 to which gas under pressure is fed from a pipe 55, the pressure in this chamber serving to force the liquid from the deposited layer 52 in a manner similar to that in which the air pressure in the space above the rotor drum in Figure 3 forces the liquid from the layer 24. Finishing or veneer-applying rollers 27a, similar to the rolls 27, may be utilized if desired, and a roll 54 similar to the roll 17 must be used. The liquid that is drained from the mix and the deposited layer is drained off through suitable pipes 51.

It will be observed that this structure is in general similar to that shown in Figures 1–4, inclusive, the tank 44 corresponding to the lower portion of the tank A, while the air chamber 50 corresponds to the portion of the tank A above the drum and the screen 46 and rollers 47 correspond to the filtering screen 12 and drum B.

Apparatus operating on the same general principles for forming pipes of asbestos-cement mix or the like is shown in Figure 23, where the reference character 56 designates a tank for the mix in which are secured perforate mandrels 57 that are surrounded by filtering screens 58, the mandrels opening at one end through the bottom wall of the tank and being closed at their other ends. The mix may be fed into the tank from an inlet pipe 59 and drained from the tank through a valve 60, and openings 61 having removable caps 62 are provided for removal of the formed pipes.

In operation of this form of the apparatus, the mix is fed into the tank from any suitable source through the pipe 59 to a level above the ends of the mandrels. Air under pressure is admitted into the tank above the level of the mix through a suitable opening 63 so as to force the mix to be deposited on the filter screens 58, the liquid from the mix being drained through the perforate mandrels and out of the tank. When layers of the desired thickness have been deposited on the filter screens, the mix is withdrawn from the tank through the valve 60, whereupon the air pressure will force the excess liquid from the deposited layers through the mandrels 57. After the layers have been sufficiently dried, the caps 62 are removed from the openings 61 and the deposited pipes can be slipped off the filter screens and out of the tank through the openings 61. It is usually desirable to rotate the mandrels while the mix is being deposited so as to provide greater uniformity of the deposit, and when the air pressure is forcing the excess liquid from the deposit, the use of rollers like the rollers 25 of Figure 3, is recommended to roll the mix on the mandrels and thereby compact, condition, and expedite drying of it.

Figure 24:
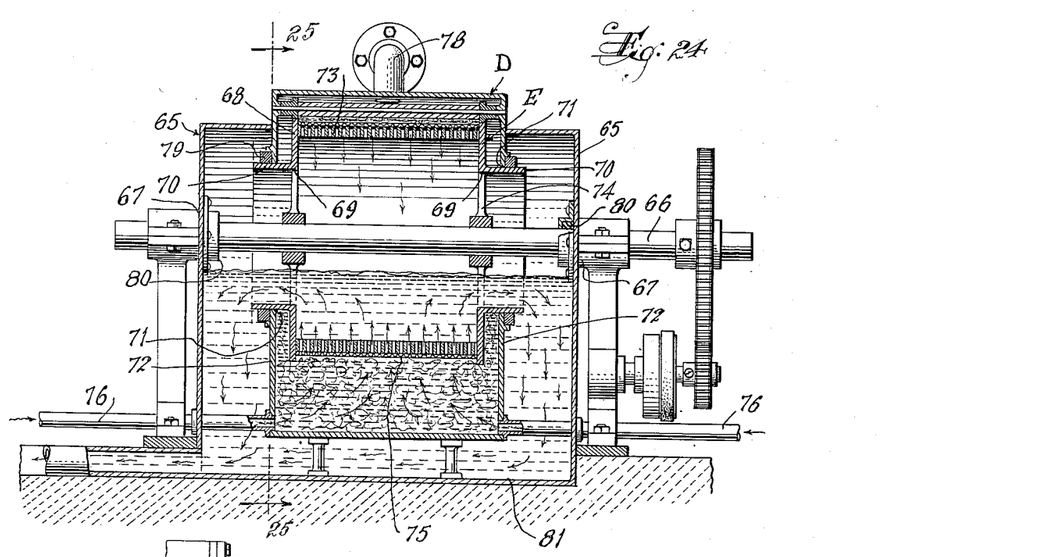
Figure 24 is a vertical longitudinal sectional view similar to Figure 4, showing another form of machine embodying the invention.
Figure 25:
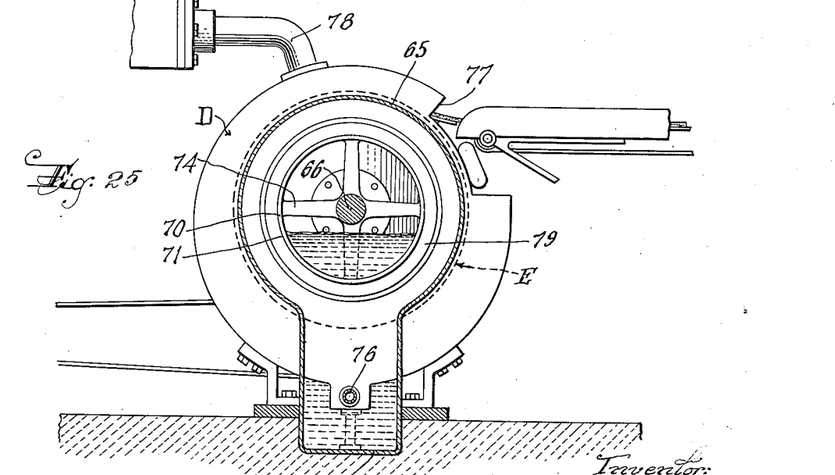
Figure 25 is an end view of the machine with portions broken away and shown in section.

As will be clear to those skilled in the art, the filtered liquid can be removed from the drum or cylinder in many different ways within the spirit and scope of the invention, and Figures 24 and 25 illustrate one such modification of the invention. The machine includes a tank D that has at opposite ends bearing supports 65 in which the horizontal drum shaft 66 is journaled in suitable bearings 67. The drum E has annular end walls 68 that define coaxial openings 69 at the ends of the drum each of which is surrounded by an annular collar or flange 70 that rotatably projects through an opening 71 in the corresponding end wall 72 of the tank D. The drum also has a perforated cylindrical peripheral wall 73 connecting the end walls and is mounted on the shaft 66 by spokes 74. The peripheral wall of the drum corresponds to the wall 5 of the drum B and may have a suitable foraminous filtering membrane 75 corresponding to the screen 12.

The mix may be supplied to the lower portion of the tank in any suitable manner, as by inlet pipes 76, and the cylindrical wall of the tank has an opening 77 corresponding to the opening 13 of Figures 1–4, inclusive, which is sealed in the same manner as the opening 13 to prevent the escape of gas pressure from the space between the upper portion of the drum and the tank to which gas pressure may be supplied by a pipe 78 corresponding to the pipe 23. Suitable sealing means 79 and 80 may be provided between the drum and the tank and between the shaft 66 and the end walls of the casing to prevent the escape of liquid and air pressure.

The depositing of the layer of material from the mix in the tank D is effected in the same manner as hereinbefore described, but the filtered liquid passes outwardly through the annular openings 69 and collars 70 and may be conveyed away in any suitable manner. As shown, the bearing supports 65 are hollow and form conduits to receive the liquid that flows from the interior of the drum E, and both bearing supports communicate with a main channel or pipe 81 through which the liquid is pumped or otherwise removed to the desired point.

This form of the machine may be otherwise constructed in substantially the same manner as the forms hereinbefore described.

In all forms of the invention, it will be understood that suitable sealing means will be utilized, and where rubber or other soft sealing materials, such as the strip 19 in Figure 5, are employed, it will be desirable to provide some means for removing accumulation of mix from the surfaces, such as the outer surfaces of the end walls of the drum, before such surfaces contact with the sealing elements, thereby to reduce the wear of the sealing elements by the ingredients of the mix. For example, spray pipes 82 may extend through the end walls of the tank in such a manner as to spray water or other suitable liquid on the end walls of the drum and also, preferably, upon the sealing strip so as to wash from the said walls of the drum and the strips any accumulation of solid materials.

Other modifications and changes in the structure of the machine will occur to those skilled in the art as within the spirit and scope of the invention.

Having thus described the invention, what I claim is:

1. A machine for forming a continuous strip of material from a wet mix of the order of liquid having cement and fibers in suspension, comprising a tank capable of holding such a mix in the lower portion thereof, said tank having an opening in a wall extending above the level of the mix and being otherwise closed, a hollow cylinder or drum having a foraminous circumferential wall and mounted in said tank to rotate on a horizontal axis so that the major portion of the periphery of at least the lower half thereof will be submerged in the mix and its upper portion will be disposed above the mix and is juxtaposed to said opening so that the interior of said drum communicates through said opening with the atmosphere, means sealing said opening to make fluid-tight the space between said mix and said drum and said tank wall except through said foraminous wall at said opening, means for raising the pressure in said space substantially above atmospheric pressure independently of the static head of the mix to first force a deposit of solids from said mix in a layer on the portion of said foraminous wall that is in said mix and to force liquid from the layer of mix on the portion of the drum that is above the level of said mix, means for removing from said drum and tank the liquid which passes through said foraminous wall, and means for guiding the deposited continuous strip from the drum through said opening.

2. A machine for forming a continuous strip of material from a wet mix of the order of liquid having cement and fibers in suspension, comprising a tank capable of holding such a mix in at least the lower portion thereof, a hollow cylinder or drum having a foraminous circumferential wall mounted in said tank to rotate on a horizontal axis so that the major portion of the periphery of at least the lower half thereof will be submerged in the mix and its upper portion will be disposed above the mix, said drum having outlet passages leading outside said tank for discharge of liquid from the interior of the drum, the end portions of the drum below the level of the mix being otherwise imperforate, means to maintain substantially atmospheric pressure within said drum comprising an opening in a wall of the tank extending above the level of the mix and juxtaposed to a portion of said circumferential wall of the drum, the tank being otherwise closed, means sealing said opening to make fluid-tight the space between said mix and said drum and said tank wall except through said foraminous wall at said opening, means for raising the pressure in said space substantially above atmospheric pressure independently of the static head of the mix to first force a deposit of solids from said mix in a layer on the portion of said foraminous wall that is in said mix and to force liquid from the layer of mix on the portion of the drum that is above the level of said mix, and means for guiding the deposited continuous strip from the drum through said opening.

3. A machine for forming a continuous strip of material from a wet mix of the order of liquid having cement and fibers in suspension, comprising a tank capable of holding such a mix in the lower portion thereof, a hollow cylinder or drum having end walls and a foraminous circumferential wall and mounted in said tank to rotate on a horizontal axis so that the major portion of the periphery of the lower half thereof will be submerged in the mix and its upper portion will be disposed above the mix, at least one end wall of said drum having a coaxial outlet passage leading out of said tank for discharge of liquid from the interior of the drum and being otherwise imperforate, means to maintain substantially atmospheric pressure within said drum comprising an opening in a wall of the tank extending above the level of the mix and juxtaposed to a portion of said circumferential wall of the drum, means sealing said opening to make fluid-tight the space between said mix and said drum and said tank wall except through said foraminous wall at said opening, means for raising the pressure in said space substantially above atmospheric pressure independently of the static head of the mix to first force a deposit of solids from said mix in a layer on the portion of said foraminous wall that is in said mix and to force liquid from the layer of mix on the portion of the drum that is above the level of said mix, and means for guiding the deposited continuous strip from the drum through said opening.

4. A machine as defined in claim 1, wherein said means for sealing said opening includes rolls spaced circumferentially of and in contact with the periphery of said drum adjacent each of opposite edges of said opening, the roll adjacent the lower edge of said opening peripherally contacts with said drum at or below the level of said mix in the space between said drum and the tank.

5. A machine as defined in claim 1, with the addition of rolls above the mix level in the tank and in the space between the periphery of said drum and said tank, said rolls to contact with the surface of the deposited layer of material, means cooperating with two adjacent ones of said rolls to support an additional mix between them and in contact with the deposited layer, whereby a film of said additional mix may be laid on said deposited layer.

6. A machine as defined in claim 1, with the addition of means for applying a surfacing mix on said deposited layer while the latter is in said high pressure space between the tank and the drum.

7. A machine as defined in claim 1, with the addition of means for limiting deposit of the solid matter from said mix upon certain zones of said foraminous wall.

8. A machine as defined in claim 1, with the addition of a channel in juxtaposed but closely spaced relation to the surface of said deposited layer on the lower portion of said drum, and means for circulating substantially clear liquid in said channel.

9. A machine as defined in claim 1, with the addition of rolls for compressing certain zones of said deposited layer on the lower portion of said drum to limit deposit of the solid matter from said mix at said certain zones.

10. A machine as defined in claim 1, wherein said drum is rotatable, said foraminous wall includes a rigid perforate cylindrical portion and an endless flexible perforate belt extending around a portion of the periphery of said cylindrical portion, and an idler roller between said cylindrical portion and said belt at said opening to direct a portion of said belt away from said cylindrical portion.

ALVAN D. SIMPSON.

REFERENCES CITED

The following references are of record in the file of this patent:

UNITED STATES PATENTS

| Number | Name | Date |
|---|---|---|
| Re. 21,201 | Qviller | Sept. 5, 1939 |
| 190,654 | Wheeler | May 8, 1877 |
| 888,482 | Gaara | May 26, 1908 |
| 1,526,553 | Kirschbraun et al. | Feb. 17, 1925 |
| 1,572,498 | McClay et al. | Feb. 9, 1926 |
| 1,771,355 | Scofield | July 22, 1930 |
| 1,830,287 | Ohlin | Nov. 3, 1931 |
| 1,869,677 | Emery | Aug. 2, 1932 |
| 1,870,971 | Sundstrom et al. | Aug. 9, 1932 |
| 1,995,802 | Forman | Mar. 26, 1935 |
| 1,995,904 | Sherman | Mar. 26, 1935 |
| 2,164,142 | Moore | June 27, 1939 |
| 2,186,761 | Malkin | Jan. 9, 1940 |
| 2,345,647 | Witham | Apr. 4, 1944 |